March 19, 1946.   C. O. BRUESTLE   2,396,637
CENTRIFUGAL CLUTCH
Filed May 3, 1944   2 Sheets-Sheet 1
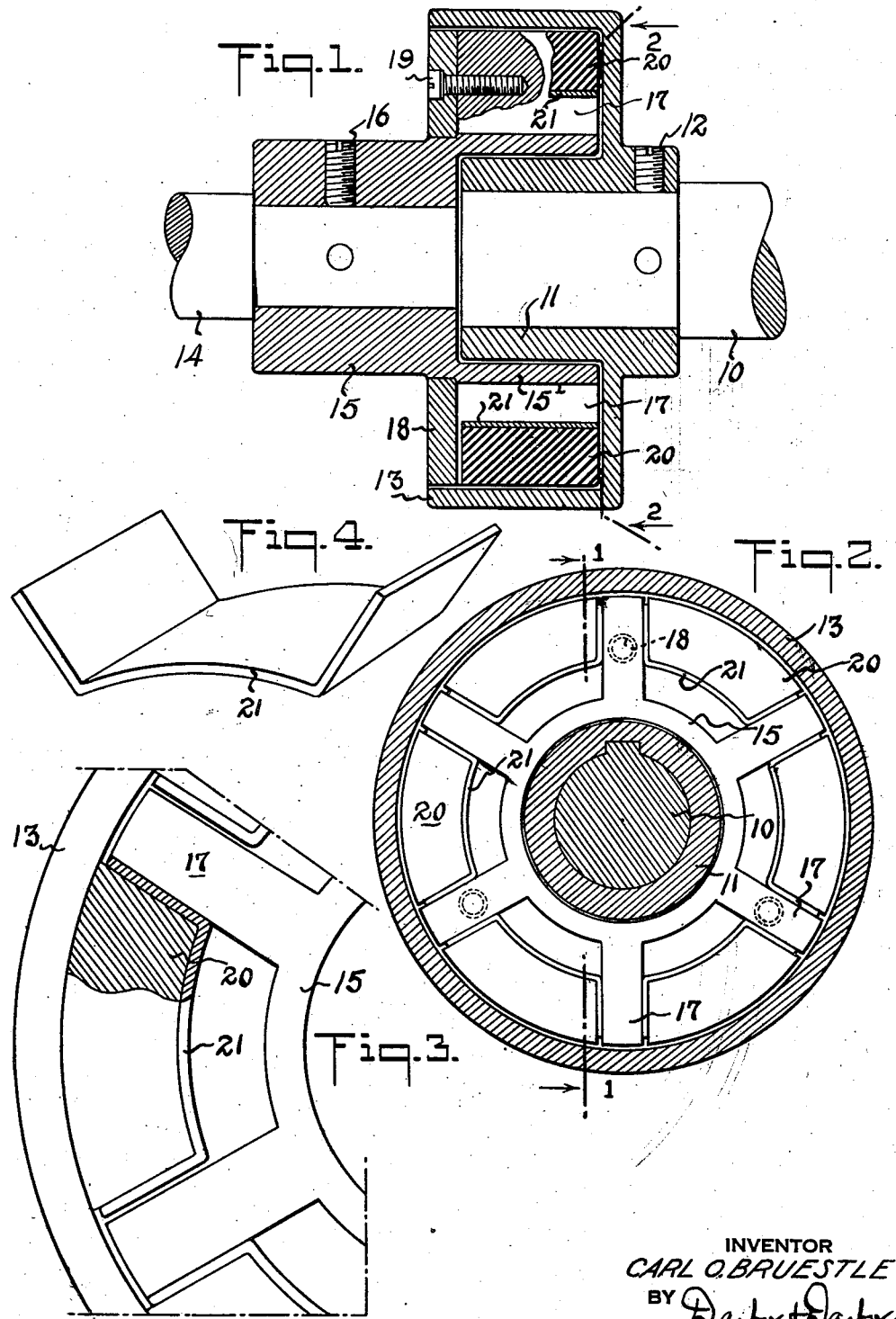
INVENTOR
CARL O. BRUESTLE
BY
ATTORNEYS.

March 19, 1946. C. O. BRUESTLE 2,396,637
CENTRIFUGAL CLUTCH
Filed May 3, 1944 2 Sheets-Sheet 2

INVENTOR
CARL O. BRUESTLE
BY
ATTORNEYS.

Patented Mar. 19, 1946

2,396,637

UNITED STATES PATENT OFFICE 2,396,637

CENTRIFUGAL CLUTCH

Carl O. Bruestle, Rahway, N. J., assignor to Syncro Machine Company, Rahway, N. J., a corporation of New Jersey Application May 3, 1944, Serial No. 533,855

3 Claims. (Cl. 192—107)

This invention relates to improvements in centrifugal clutches and is particularly concerned with structural features which permit of the replacement of a detachable wear plate interposed between the clutch housing and the friction shoes.

Another object of this invention is to provide a construction in which the replaceable wear plate also acts as a shock absorber between the parts.

A still further object of the invention is the provision of a novel form of friction shoe construction which is simple in construction and particularly adapted in manufacture to easy assembly in a manner to produce a balanced clutch.

Other and more detailed objects of the invention will be apparent from the several embodiments thereof illustrated in the attached drawings and described fully below.

This invention resides substantially in the combination, construction, arrangement and relative location of parts as will be described in detail below.

In the accompanying drawings,

Figure 1 is a cross-sectional view taken on the line 1—1 of Figure 2, of a friction clutch embodying some features of this invention;

Figure 2 is a cross-sectional view taken on the line 2—2 of Figure 1;

Figure 3 is an enlarged detailed elevational view of a portion of the clutch of Figure 1 when viewed from the left with the cover plate removed, and with a portion of one friction shoe and wear plate broken away;

Figure 4 is a perspective view of one of the wear plates;

Figure 5:
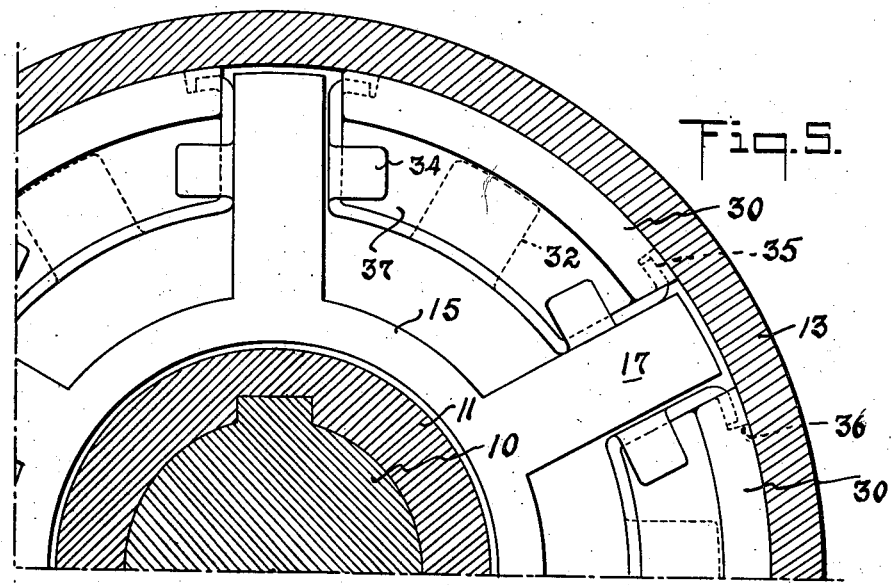
Figure 5 is an enlarged cross-sectional view of a portion of a modified clutch, which view corresponds in location to the view in Figure 2.

Centrifugal friction clutches are widely used today in various forms of mechanical power transmission systems because of their well known operational characteristics. In the manufacture and use of these devices there are several difficulties which have not been satisfactorily overcome, and it is a broad object of this invention to provide simple commercial solutions of these problems.

One of the operational difficulties inherent in the use of centrifugal friction clutches is the excessive wear which occurs on the friction shoes as they undergo the radial movement incident to their use under the centrifugal forces involved. An object of this invention is to provide a replaceable wear plate for the friction shoes which may be inexpensively replaced when sufficiently worn to substantially put the clutch back in its original condition.

A structural difficulty in the manufacture of these devices is present in the forms in which they are now made which makes it difficult to easily vary the rated loads to which the clutches may be subjected. In addition, in the manufacture of these clutches it is necessary to balance them nicely in order that they do not set up in use disturbing vibrations due to unbalance. In accordance with this invention both the balance and the capacity of the clutches may be easily varied by reason of the construction provided. In addition the feature of replaceable wear plate is also incorporated therewith.

As illustrated in Figures 1 to 4 inclusive, centrifugal friction clutches generally comprise a clutch member composed of two parts forming a housing respectively connected to the driving and driven shafts and forming an enclosure for the friction shoes. One such construction is illustrated in the drawings as comprising a cup shaped housing 13 having an integral hub 11 attached to the driven shaft 10 by means of set screws 12 or other equivalent securing means, as for example a key, as illustrated in Figure 2. The driving shaft 14 has mounted thereon a spider comprising a hub 15 attached to the shaft by means of set screws 16, a concentric tubular extension 15' which nests with the projecting hub 11, and provided with a series of radial wings 17 forming the spider. The detachable cover plate 18 is secured to one or more of the wings 17 by means of the machine screws 19, as illustrated, lies concentric with the hub 15. These parts when assembled provide a housing defining a plurality of segmental shaped plates as clearly illustrated in Figure 2.

It is within these spaces in accordance with usual practice that the friction shoes are mounted. Thus as illustrated in Figure 2, the friction shoes 20 which are weighted members of any suitable material, are segmental in shape and of such length with respect to the segmental spaces that they can be raised as illustrated in Figure 2 after limited movement inwardly in a radial direction. Thus when the clutch is at rest these shoes are out of contact with the cylindrical portion 13 of the driven part of the housing.

Assuming counterclockwise rotation of the parts in Figure 2 when the device is in operation, it will be seen that the driven ends of each of the friction shoes will not give relative sliding movement with respect to the adjacent faces of the wings 17 as the device starts and stops. These parts will be under considerable pressure due to the driving forces encountered accentuating the wear which occurs between the contacting faces. Of course, if the device in operation is running in the opposite direction the wear will be at the other ends of the shoes. In accordance with this invention the shoes are made sufficiently smaller in circumferential extent than the segmental spaces between the wings 17 so that there may be interposed therebetween a wear and shock absorbing plate 21. This plate may be made of any suitable material including preformed brake lining materials of the many forms now known, or they may be made of fiber, natural and synthetic resins, plastics and other wear resisting materials capable of being molded or preformed to the necessary shape. As illustrated it is unnecessary to attach these plates to the friction shoes since under the centrifugal and gravitational forces involved in the operation of the clutch they will move with the friction shoes. Assuming that the clutch is always driven in one direction it will be seen that when the working ends of the wear plates have become unduly worn they can be replaced with other plates or reversed end for end until the other ends thereof are worn. Of course, if the device operates frequently in each direction so that the wear is substantially equal on both ends of these plates, they can be readily replaced as worn by new wear plates. This provides a simple, inexpensive expedient for overcoming this common weakness in such devices.

Figure 6:
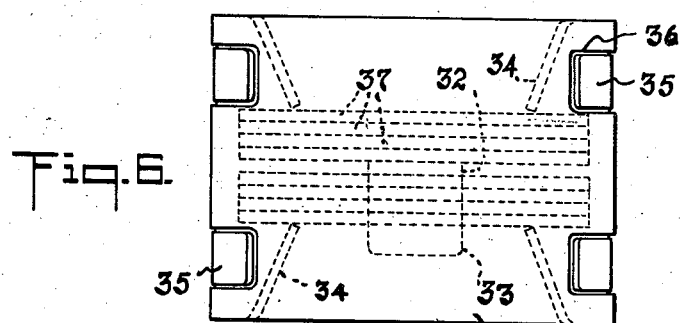
Figure 6 is a top plan view of one of the friction shoes comprising this modification.
Figure 7:
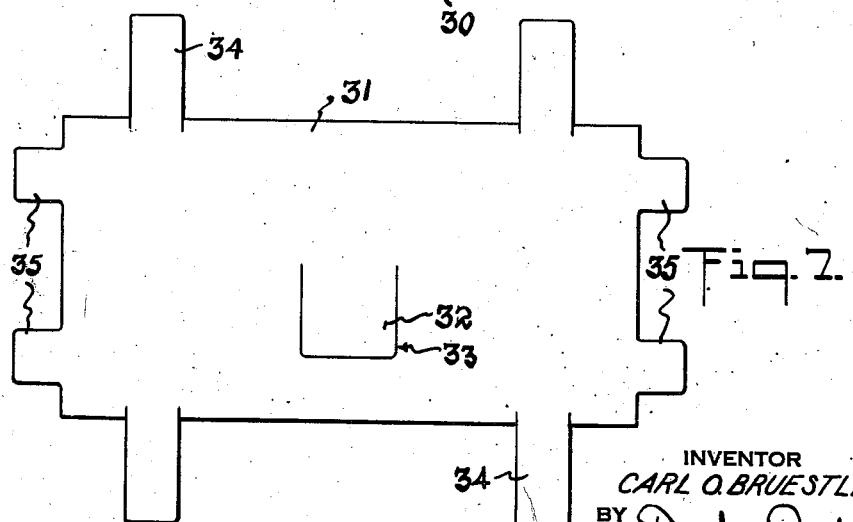
Figure 7 is a plan view of the clip or housing forming part of the friction shoe of Figure 6.

The feature of the construction shown in Figures 5 to 7 inclusive is also concerned with the friction shoes, the other parts of the device being old in the art and like the corresponding parts of the modification first described. In this case the friction shoes are built up from a series of simple parts which are adapted to easy assembly and proper weighting to meet the rating requirements of the clutch and to effect a dynamic balance thereof. The friction shoes in this case comprise the shoe proper, that is the friction member 30 which may be made of any suitable material and molded or cast as manufacturing requirements dictate. Mounted on these friction shoes are housings formed from the sample plate 31 stamped out of any suitable material, as for example metal. This housing member comprises a generally rectangular central body portion having two pairs of side extensions or clips 34 and two pairs of end extensions or clips 35. In addition there is struck out of the body portion a lug 32 which is bent into upstanding relation and positioned so as to be at the center of the main body portion in all directions, leaving an opening 33 as will be apparent to those skilled in the art. This housing member is bent up, as is clear from Figures 5 and 6, so that the extensions 35 are locked into the recesses 36 formed in the ends of the friction shoe 30. A series of suitably shaped plates 37 are then slipped into the space between the shoe 30 and the body portion of the plate 31, so as to lie in parallel relation on opposite sides of and in contact with the upstanding lug 32. These segmental shaped plates can be made of any suitable material having the desired weight, as for example they may be made of iron, steel, lead or the like, and the number thereof will depend upon the power transmitting capacity of the particular clutch being constructed. Preferably an equal number of these plates are applied to the opposite sides of the lug 32 and they may be available in various thicknesses so that the desired finished weight of the complete shoe assembly can be secured. By carefully constructing these plates it is possible to make the complete assemblies of the friction shoes equal so that the clutch in use will be in dynamic balance.

The plates 37 are held in place by bending inwardly the sub-extensions 34 as clearly noted in Figure 6, so as to lock them in place on opposite sides of the lug 32 in the cage thus formed. It will be seen that any small discrepancies in weight between a set of these shoes can easily be eliminated before the plates are finally locked in place by removing a small portion of one or two of the plates as conditions require. In this arrangement the ends of the cage thus formed provide the wear plates and if the clutch is continuously operated in one direction the shoe assemblies can be turned end for end as the wear becomes excessive, so as to substantially double the life of the structure. Likewise, a new cage comprising the plate 31 can be substituted when the old one is worn out.

From the above description it will be apparent to those skilled in the art that the subject matter of this invention is capable of some variation without departure from the novelty thereof, and I prefer therefore to be limited by the claims granted me rather than by the illustrative disclosure herein.

What is claimed is:

1. A friction member for a centrifugal clutch comprising a segmental shoe, a cage detachably secured to said shoe and a plurality of weighting plates locked in said cage, said cage having integral lugs for attaching it to the shoe and for locking the plates therein.

2. A friction member for a centrifugal clutch comprising a segmental shoe, a cage detachably secured to said shoe and a plurality of weighting plates locked in said cage, said cage having integral lugs for attaching it to the shoe and for locking the plates therein and including an integral positioning lug interposed centrally of said plates.

3. A friction member for a friction clutch comprising a friction shoe and a single piece replaceable wear plate enclosing an opposite pair of ends of said shoe, said wear plate being detachably secured to said shoe and having a wall spaced therefrom and a plurality of weighting plates locked to said wear plate and lying between it and said shoe.

CARL O. BRUESTLE.